United States Patent [19]

Nakai et al.

[11] Patent Number: 4,828,611
[45] Date of Patent: May 9, 1989

[54] HIGH HARDNESS SINTERED COMPACT AND PROCESS FOR PRODUCING THE SAME

[75] Inventors: Tetsuo Nakai; Syuzi Yazu; Keizo Asai; Yoshiaki Kumazawa, all of Itami, Japan

[73] Assignee: Sumitmo Electric, Osaka, Japan

[21] Appl. No.: 140,921

[22] Filed: Dec. 28, 1987

Related U.S. Application Data

[63] Continuation of Ser. No. 4,835, Jan. 13, 1987, abandoned, which is a continuation of Ser. No. 674,163, Nov. 23, 1984, abandoned.

[51] Int. Cl.$^4$ .............................................. C22C 29/06
[52] U.S. Cl. ...................................................... 75/237
[58] Field of Search ................. 75/236, 237, 238, 241, 75/242, 243; 419/14; 51/307, 309

[56] References Cited

U.S. PATENT DOCUMENTS

| | | | |
|---|---|---|---|
| 4,097,274 | 6/1978 | Bakul et al. | 75/241 |
| 4,171,973 | 10/1979 | Hara et al. | 75/241 |
| 4,231,762 | 11/1980 | Hara et al. | 75/237 |
| 4,303,442 | 12/1981 | Hara et al. | 75/243 |
| 4,505,746 | 3/1985 | Nakai et al. | 75/243 |

FOREIGN PATENT DOCUMENTS 1382080  1/1975  United Kingdom .

Primary Examiner—Stephen J. Lechert, Jr.
Assistant Examiner—Eric Jorgensen
Attorney, Agent, or Firm—Kerkam, Stowell, Kondracki & Clarke

[57] ABSTRACT

Herein is disclosed a high hardness sintered diamond compact and a process for the production of the same.

The high hardness sintered diamond compact comprises 80 to 95% by volume of diamond particles, 0.5 to 5% by volume of a carbide particles selected from a group consisting of WC and (Mo,W)C and having a diameter not larger than 1 micron, and 4.5 to 15% by volume of an iron group metal, at least 95% by volume of said diamond particles having a diameter from 0.1 to 2 micron and the remainder of the diamond particles being particles having a diameter smaller than 0.1 micron.

The ratio by volume of the amount of the diamond particles having a diameter from 1 to 2 micron to that of the diamond particles having a diameter from 0.1 to 1 micron ranges from 4 to 1.

The high hardness sintered diamond compact according to the present invention is preferably usable as a drawing die for drawing a high hardness plated-steel wire and as a tool bit.

The process according to the invention, comprises the steps of:

preparing a diamond powder having a particle diameter distribution from 0.2 to 2 micron;

mixing the diamond powder with an iron group metal and one member selected from the group consisting of WC and (Mo,W)C powders each having a particle diameter not larger than 1 micron;

hot-pressing the thus obtained mixture of powders at an ultra-high pressure and a high temperature where diamond may be stable.

2 Claims, 1 Drawing Sheet

HIGH HARDNESS SINTERED COMPACT AND PROCESS FOR PRODUCING THE SAME

This is a continuation of application Ser. No. 004,835, filed 1/13/87 which is a continuation of application Ser. No. 674,163, filed Nov. 23, 1984, both now abandoned.

FIELD OF THE INVENTION

The present invention relates to a high hardness sintered diamond compact and a process for producing the same.

DESCRIPTION OF THE PRIOR ART

There are now sold at the market sintered diamond compacts containing more than 70% by volume of diamond which are intended for use in a cutting tool for cutting nonferrous metal, synthetic resin, ceramics and also in a wire drawing die. The sintered diamond compact containing finer diamond particles was preferably used for preparing a die for drawing a steel wire of relatively low hardness, because the drawn wire presents a smooth surface. However, in the case of rolling a plated steel wire of high hardness such as a high carbon steel wire plated with brass, zinc or copper, there has not been any sintered diamond compact from which a rolling die could be prepared with satisfying properties.

For example, there is disclosed, in U.S. Pat. No. 4,171,973, a sintered diamond compact which comprises 95 to 20% by volume of diamond particles finer than 1 micron in size and the balance being binder of WC or (Mo,W)C particles. When used as a drawing die for a high hardness wire, however, such a sintered diamond compact does not show a satisfying result.

OBJECTS OF THE INVENTION

It is therefore an object of the present invention to solve the above described problems of the prior art and to provide a high hardness sintered diamond compact which is free from the defects of the conventional sintered diamond compact.

It is another object of the present invention to provide a high hardness sintered diamond compact which is preferably usable as a drawing die for high hardness wire such as a plated steel wire.

It is further an object of the present invention to provide a process for the production of a high hardness sintered diamond compact which is preferably usable as a drawing die for high hardness wire such as a plated steel wire.

SUMMARY OF THE INVENTION

According to the present invention, there is provied a high hardness sintered diamond compact comprising 80 to 95% by volume of diamond particles, 0.5 to 5% by volume of a carbide particles selected from a group consisting of WC and (Mo,W)C and having a diameter not larger than 1 micron, and 4.5 to 15% by volume of an iron group metal, at least 95% by volume of said diamond particles having a diameter from 0.1 to 2 micron and the remainder of the diamond particles being particles having a diameter smaller than 0.1 micron.

According to an embodiment of the invention, it is preferable that the ratio by volume of the amount of the diamond particles having a diameter from 1 to 2 micron to that of the diamond particles having a diameter from 0.1 to 1 micron ranges from 4 to 1.

According to the present invention, there is provided a process for producing the high hardness sintered diamond compact, which comprises:

preparing a diamond powder having a particle diameter distribution from 0.2 to 2 micron;

mixing the diamond powder with an iron group metal and one member selected from the group consisting of WC and (Mo,W)C powders each having a particle diameter not larger than 1 micron, thereby obtaining a mixture containing 80 to 95% by volume of diamond particles of which at least 95% by volume have a diameter from 0.1 to 2 micron;

hot-pressing the thus obtained mixture of powders at an ultra-high pressure and a high temperature where diamond may be stable.

The mixing may be conducted by grinding the diamond powder with the iron group metal and optionally with one member selected from the group consisting of WC and (Mo,W)C powders by using a pot and ball having a lining of a cermet of WC or (Mo,W)C bonded with an iron group metal, whereby WC or (Mo,W)C powder abraded from the lining being mixed thereto.

The above objects, features, and advantages of the invention will become more apparent upon a reading of the following description which will be made in connection with the accompanying drawing; in which, FIG. 1 schematically shows how the wire is drawn by a die.

DETAILED DESCRIPTION OF THE INVENTION

Figure 1:
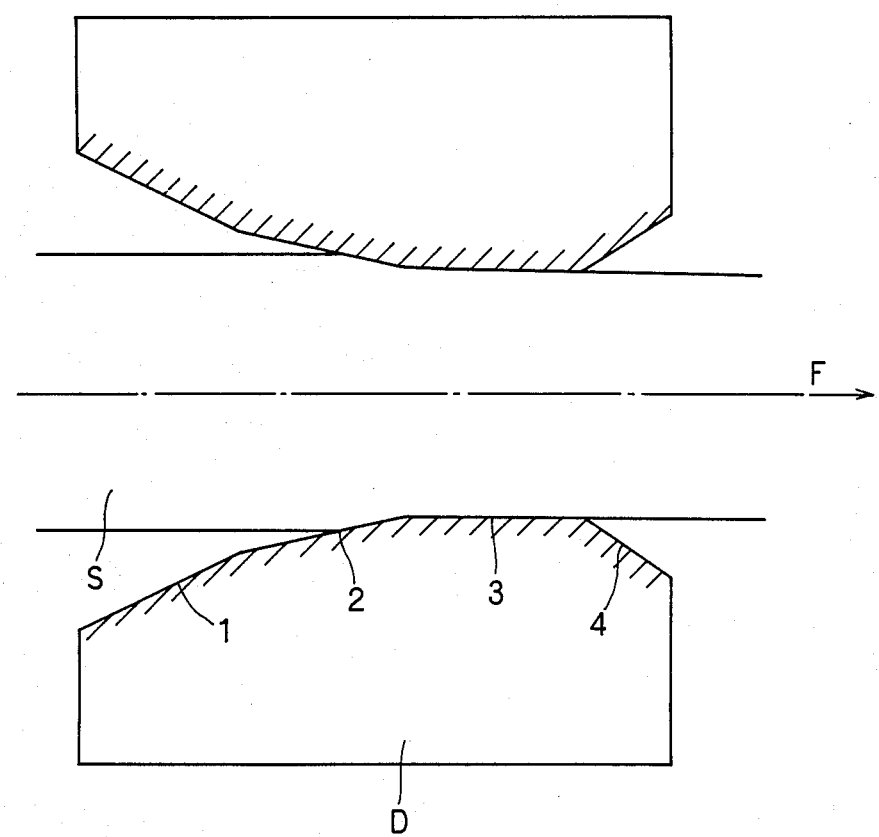

In order to examine the reason why the commercially available sintered diamond compact does not give a satisfying result as a die for rolling a high hardness plated steel wire, we, the inventors, have prepared drawing dies from three kinds of sintered diamond compacts containing diamond particles having respectively a diameter range from 30 to 60 micron, from 2 to 6 micron and less than 1 micron as disclosed in Japanese No. 22333/1 78, and conducted drawing of a brass-plated steel wire with these dies. At the end of the predetermined life time of each die, the drawn wire surface and the inner surface of each dies were examined. All of these dies showed longitudinal flaws at the inner surface thereof, which were copied onto the wire surface. These flaws extended across a length of 1 to 3 micron and to a considerable depth. Moreover, the amount of the plated brass on the wire surface was also decreased after drawing.

In the case of drawing with a die containing diamond particles of 30 to 60 micron, the wire is brought into contact with the die at the reduction part. At that reduction part, the wire surface scratches the die so that diamond particle is torn off or the edge portion of the diamond particle is broken.

In the case of drawing with a die containing diamond particles of 2 to 6 micron, diamond particles of about 2 micron are torn off and give flaws to the inner surface of the die. On the other hand, in the case of drawing with a die containing diamond particles finer than 1 micron, diamond particles are torn off individually and in agglomerate to give fine and large flaws onto the die surface.

These phenomena will be explained in more detail with reference to FIG. 1.

FIG. 1 shows how the wire is drawn by a die.

The inner surface of the drawing die D can be classified into four parts;

an approaching part 1 through which the wire S approaches to the inner surface of the die D;

a reduction part 2 where the wire S is brought into contact with the inner surface of the die D and reduction in section of the wire is effected;

a bearing part 3 on which the reduced wire passes; and, a back relief part 4 at which the wire leaves the die surface.

During the drawing operation, there are exerted a vertical force and a frictional force between the contacting surface of the die D and the wire S. Then, the maximum principal force is generated at the contacting portion of the reduction part 2 with the wire S, while the maximum frictional force is generated near the boundary between the bearing part 3 and the back relief part 4. Particularly when a high strength material is drawn, the vertical and frinctional forces are increased to increase the maximum principal stress and the maximum shear stress.

The diamond skeleton of the sintered compact, that is, the contacting portion of diamond particles, contains impurities such as catalytic agents, and then the mechanical strength is the lowest at that portion. If a principal stress or shear stress is applied to that portion, the stress is concentrated at that portion including impurities. Particularly, the contacting position of the reduction part 2 with the wire S is varied and thus repetitive stress is always applied to the reduction part 2 to thereby develop cracking therein.

In the case of a sintered diamond compact containing diamond particles of which diameter ranges from 30 to 60 micron, the maximum principal stress is exerted when the wire contacts with the reduction part 2, so that the diamond skeleton is partially broken out, while diamond particles of a large diameter are not torn off.

In the case of a sintered diamond compact containing diamond particles of which diameter ranges from 2 to 6 micron, the diamond skeletons formed therein are smaller in size and thus the diamond skeletons are easily broken so that diamond particles are torn off therefrom.

In the case of a sintered diamond compact containing diamond particles finer than 1 micron, the diamond skeletons formed therein are further smaller in size. Thus, in drawing operation, agglomerates of several diamond particles are torn off so that they give large flaws on the inner surface of the die.

The reason of the reduction in amount of the plated brass is considered as follows:

The drawn wire is dynamically recovered at the back relief part 4 so that the wire becomes larger in diameter. When the surface of the back relief part 4 is rough, it scratches the wire surface and scrapes off the plated metal. Further, the diamond particles torn off from the reduction part 2 scratches the die surface not only at the bearing part 3 but also at the back relief part 4. Accordingly, it is considered that the more flaws are formed on the die surface, the more the plated metal is scraped off from the wire surface during the drawing.

From the above experiment, it is understood that, for the sintered diamond compact of finer diamond particles, it is necessary to prevent the tear-off of the agglomerate of diamond particles, and for the sintered diamond compact of coarser diamond particles, it is necessary to prevent the break out of the diamond skeletons.

We have further made a research for improving the sintered diamond compact of the prior art. Firstly in trying to prevent the break out of the diamond skeletons, we have prepared a die from a sintered diamond compact using coarser diamond powder and conducted drawing of a brass-plated steel wire therethrough. But the diamond skeletons were broken out to give flaws to the die.

Nextly, we have conducted a drawing test with a die made from a sintered diamond compact disclosed in Japanese Laid-open No. 47771/1982, for which one of us is inventor. However, the sintered diamond compact of this prior art contains a high amount of carbide so that the binding strength between the diamond particles is not sufficiently high to prevent the tear-off of the diamond particles finer than 1 micron when a high stress is applied thereto.

After these experiments, we found that a high drawing performance can be obtained by a sintered diamond compact in which diamond particles dispersed therein have a certain particle diameter distribution.

According to the present invention, at least 95% by volume of the diamond particles contained in the sintered diamond compact must have a diameter ranging from 0.1 micron to 2 micron.

In a sintered diamond compact having a particle diameter distribution according to the present invention, diamond particles finer than 1 micron are dispersed around the larger diamond particles and bonded tightly thereto so that the tear-off of the agglomerate of small diamond particles is effectively prevented, while diamond particles coarser than 1 micron are surrounded by finer diamond particles dispersed therearound so that the tear-off of coarser diamond particles is also effectively prevented.

If the sintered diamond compact contains diamond particles coarser than 2 micron, such diamond particles would be easily torn off during drawing operation and the die surface would become rougher, which in turn scratches the wire surface and further decreases the amount of the metal plated on the wire.

On the other hand, if the sintered diamond compact contains diamond particles finer than 0.1 micron in an excessive amount, such fine diamond particles agglomerate together and are not strongly bonded to each other, so that they would be easily torn off during the drawing operation. Accordingly at least 95% by volume of the diamond particles contained in the sintered diamond compact must have a diameter larger than 0.1 micron.

Further it is preferable that the ratio by volume of the amount of diamond particles having a diameter distribution from 1 to 2 micron to that of diamond particles having a diameter distribution from 0.2 to 1 micron ranges between 4 and 1. If the sintered diamond compact contains diamond particles finer than 1 micron in a ratio exeeding the above range, the bonding strength between the diamond particles is not so high and the tear-off of the finer diamond particles would occur during its use. On the other hand, if the sintered diamond compact contains diamond particles coarser than 1 micron in a ratio exeeding the above range, coarse diamond particles are not sufficiently surrounded by finer diamond particles and the diamond skeletons between coarser diamond particles are readily broken out during the drawing operation.

The sintered diamond compact according to the present invention must contain 80 to 95% by volume of diamond particles. With less than 80% by volume of diamond particles, diamond particles are not sufficiently contacted to each other and thus bonded with carbide or only with binder metal, so that diamond particles are not held strongly in place and the wearing resistance of the sintered diamond compact is lowered. On the other hand, with diamond particles in an amount higher 95% by volume, diamond particles are not sufficiently bonded by the binder metal so that they would be readily torn off during its use.

According to the present invention, the sintered compact contains WC or (Mo,W)C in an amount higher than 0.5% by volume. If the content of the carbide is lower than 0.5% by volume, the iron metal would agglomerate around the diamond particles to thereby lower the bonding strength between the diamond particles. On the other hand, with carbide of more than 5% by volume, there would be too much carbide at the bonding portions, that is, at the skeltons between diamond particles, which lowers the strength of the diamond skeletons.

Here (Mo,W)C means a material which is obtained by replacing a part or almost all of W in WC by Mo, and which has a same crystal structure as WC. This complex carbide includes, for example, $(Mo_7W_3)C$ and $(Mo_5W_5)C$.

The sintered diamond compact according to the present invention contains 4.5 to 15% by volume of iron group metal such as Co, Ni and Fe. If the content of the iron group metal is less than 4.5% by volume, the diamond particles are not bonded to each other and would be easily torn off during the use. On the other hand, with an iron group metal of more than 15% by volume, the amount of the diamond particles becomes proportionally decreased and then the wearing resistance of the resulting sintered diamond compact would be lowered.

The process for the production of a sintered diamond compact will be explained hereinafter.

For the firat step, a diamond powder having a particle diameter distribution of from 0.2 to 2 micron is prepared. The diamond powder used for the sintered diamond compact of the present invention may be artificial diamond or natural diamond.

The diamond powder of such particle size is then mixed with a powder of iron group metal and optionally with a powder of WC or (Mo,W)C by means of a ball mill. During the mixing step, the diamond powder is ground to smaller particle size. Then the mixing step should be conducted not so as to make the diamond powder too fine. The iron group metal may not be mixed at this stage and it may be added to the diamond powder before the sintering so as to melt and permeate into the diamond powder during the sintering step.

In practice, in order to mix thoroughly the diamond powder with other powder of iron group metal or carbide, it is convenient to mix diamond and WC powder by wet ball-milling by using cemented carbide balls in a pot having a cemented carbide lining. Further, an attritor or vibration milling can be employed in the same manner as ball-milling. The mixing operation may be performed for 30 minutes to one week.

Since diamond is very hard, a relatively large amount of abraded powder from the balls and pot lining mixes in the diamond powder. Therefore, it is convenient to use this as a binder component, especially if the composition of the balls and lining are the same as that of a binder. Such mixing step is disclosed in Japanese Patent Laid-open No. 51381/1977.

The thus obtained mixture is heated to a temperature higher than 1300° C. to graphitize a part of the diamond powder and then charged in a hot press die of superhigh pressure, and then the sintering is conducted under a condition where the diamond may be stable. In this case, the sintering must be conducted at a temperature higher than the eutectic point of the iron group metal and the carbide.

Hot-pressing shoulld be performed under the conditions of temperature and pressure within the stable range of diamond. This range is well-known as Berman-Simon equilibrium line. Generally, the sintering is performed at 1200° C. to 1600° C. under 40 to 80 Kb for 5 to 60 minutes.

Meanwhile, upon sintering the diamond compact of the present invention, it is necessary to depress the crystal growth of diamond in every way. According to an experiment, when there exists in a binder a slight amount of iron group element such as Co, Fe or Ni together with WC, crystals of diamond and WC tend to grow if the temperature is too high. However, the conditions for producing the sintered compact of the invention is preferably heated at temperatures over the liquidus point of eutectic mixture comprising iron group element, diamond and WC, but within the range of 100° C. over the point. If the metal content in the binder is previously reduced by acid, higher temperatures may be applied.

Since the materials of the sintered compact are very fine, a large amount of gas adsorbs thereon. Therefore, it is preferable to degas by heating the materials in vacuum at temperatures higher than 300° C. When the temperature is lower than 300° C., the treatment requies a longer time, and is not industrially applicable.

The powdered mix for producing the sintered compact of the invention can be cold-pressed into a green compact before sintering, at a room temperature under the pressure of 200 kg/cm² to 2 t/cm².

According to an embodiment of the present invention, a drawing die is preferably mounted in a case of a cermet comprising WC or (Mo,W)C and and an iron group metal to prevent cracking which otherwise would be formed in the radial direction of the die due to a high pressure during the drawing operation of high strength wire.

When the die made of the sintered diamond compact of the present invention is used for drawing a high strength plated wire, the die should be worked and finished to have a smooth surface at the bearing part and the back relief part.

The sintered diamond compact of the present invention has a sufficiently high strength and an excellent wearing resistance because of a high bonding strength between the diamond particles contained therein. Such excellent properties of the sintered diamond compact of the present invention assures use thereof as a material for cutting tool. The cutting tool using the sintered diamond compact of the present invention gives a smooth cutted surface and has an excellent wearing resistance.

In preparing the cutting tool from the sintered diamond compact of the present invention, it is preferable to bond the sintered diamond compact to a substrate member of, for example, a hard sinered alloy during the sintering process of the compact.

The present invention will be explained by way of examples which should not be conttrued to restrict the scope of the invention but only to be an illustration of the invention.

EXAMPLE 1

A diamond powder A of which particles have a diameter ranging from 0.5 to 1 micron and a diamond powder B of which particles have a diameter ranging 1 to 2 micron were mixed at a ratio of 3:7 and the mixture was then subjected to a ball-milling by using a pot and ball of (Mo,W)C-Ni-Co for one hour to obtain a green compact. The thus obtained green compact contained 95.5% by volume of diamond powder, 3.3% by volume of (Mo,W)C and 1.2% by volume of (Co+Ni). The diamond powder of this mixture showed a particle distribution that the ratio of the amount of the particles having a diameter of from 0.2 to 1 micron and that of the particles having a diameter of from 1 to 2 micron is 35:75.

After the pretreatment of the mixture, the obtained green compact was packed in a container of (Mo,W)C-Ni-Co and hot-pressed at a pressure of 55 kb and a temperature of 1400° C. for 15 minutes. Microscopic observation showed that higher than 95% by volume of the diamond particles contained therein present a diameter of from 0.2 to 2 micron and these are are bonded solidly to each other. The sintered diamond compact contained 88% by volume of diamond, 2.7% by volume of (Mo,W)C and 9.3% by volume of (Co+Ni).

Four sets of drawing dies each having an inner diameter of 0.250 mm were prepared respectively from the above sintered compact, sintered compacts of the prior art of which diamond particles are respectively finer than 1 micron, from 2 to 6 micron, and from 30 to 60 micron. Each drawing die was finished by grinding also the back relief part.

A brass-plated steel wire was drawn at a wire speed of 1000 m/min by using these drawing dies in a lubricating oil. With the drawing die made from the sintered compact of the present invention, the steel wire of 5.6 ton could be drawn, while, with the dies made from the sintered compacts of diamond particles smaller than 1 micron, from 2 to 6 micron and 30 to 60 micron, only 2.0, 2.1 and 1.5 ton of steel wire could be drawn respectively.

EXAMPLE 2

Various diamond powders were mixed thoroughly by means of ball mill together with a carbide of WC or (Mo,W)C and a Co or (Ni+Co) powder to respectively have a chemical composition and a diameter distribution of diamond particles as shown in Table 1. The mixture was then pretreated and each of the obtained green compacts was then packed in a container of Ta and subjected to a sintered process under the same condition as Example 1. Each of the resulting sintered diamond compact was worked to a die having an inner diameter of 0.175 mm. With each die, a brass-plated steel wire was drawn at a wire speed of 1000 mm/min in a lubricating oil and the life time of each die is indicated also in Table 1 in terms of an amount of the drawn wire.

TABLE 1

| SPECIMEN NO. | DIAMOND PARTICLE SIZE | CONTENT | CONTENT OF WC | CONTENT OF (MoW)C | CONTENT OF IRON METAL | AMOUNT OF DRAWN WIRE (ton) |
|---|---|---|---|---|---|---|
| I* A | 0.5~2 μm | 96 | 1.0 | | 3.0 Co | 0.8 |
| B | 0.3~1.5 μm | 93 | 2.0 | | 5.0 Co | 2.9 |
| C | 0.2~2 μm | 90 | | 2.5 | 7.5 (Ni + Co) | 3.3 |
| D | 0.2~2 μm | 85 | 4.0 | | 11.0 | 3.1 |
| E | 0.2~2 μm | 80 | | 5.0 | 15.0 (Ni + Co) | 2.7 |
| II** F | 0.2~2 μm | 75 | 5.0 | | 20.0 Co | 1.1 |
| G | 0.1~1 μm | 90 | 2.0 | | 8.0 Co | 1.0 |
| H | 6~12 μm | 90 | 2.0 | | 8.0 Co | 1.5 |
| I | 0.2~2 μm | 90 | 0 | 0 | 10.0 Co | 1.3 |
| J | 0.2~2 μm | 90 | 6.0 | | 4.0 Co | 0.9 |

*I: INVENTION
**II: COMPARISON
※ CONTENT IS % BY VOLUME

EXAMPLE 3

The sintered diamond compact of specimen C of Example 2 was worked to a drawing die having an inner diameter of 1.2 mm. Copper plated wire was drawn with this drawing die.

For comparison, the same drawing test was conducted by using drawing dies of sintered diamond compact containing diamond particles of from 30 to 60 micron and also a hard sintered alloy. While 20 ton of copper-plated steel wire was drawn by single die of the present invention, with the above drawing dies of the prior art, only 20 ton and 800 kg of the steel wire could be drawn respectively.

EXAMPLE 4

Tool bits were prepared respectively from the specimen D of Example 2 and from a sintered diamond compact of the prior art of which diamond particles were finer than 10 micron. For working the sintered compacts into a tool bit, it took 10 minutes in the case of the sintered compact of the present invention, while it took 25 minutes in the case of the prior art.

With these tool bits, Al-25%Si was machined at a speed of 300 m/min, with a depth of 0.2 mm and at a feeding speed of 0.05 mm/rev for 60 minute. Then the abrasion amount of the flank of each bit was determined. In the case of the bit of the present invention, the abrasion was 0.040 mm, while that of the prior art bit was 0.043 mm. The surface roughness curve of the cutted surface was also determined. $R_{max}$ of the surface machined by the bit of the invention was 1 micron, while that of the surface machined by the prior art bit was 3 micron.

We claim:

1. A high hardness sintered diamond compact comprising 80 to 95% by volume of diamond particles, 0.5 to 5% by volume of a carbide particle selected from a group consisting of WC and (MoW) C and having a diameter not larger than 1 micron, and 4.5 to 15% by volume of an iron group metal, at least 95% by volume of said diamond particles having a diameter from 0.1 to 2 micron and the remainder of the diamond particles being particles having a diameter smaller than 0.1 micron, and the ratio by volume of the amount of the diamond particles having a diameter from 1 to 2 micron to that of the diamond particles having a diameter from 0.1 to 1 micron ranging from 4 to 1.

2. The high hardness sintered compact of claim 1 wherein the compact is so constructed and arranged to be used in a wire drawing die tool.

* * * * *

UNITED STATES PATENT AND TRADEMARK OFFICE
CERTIFICATE OF CORRECTION

PATENT NO. : 4,828,611

DATED : May 9, 1989

INVENTOR(S) : Nakai et al

It is certified that error appears in the above-identified patent and that said Letters Patent is hereby corrected as shown below:

The name of the Assignee should read:
    Sumitmo   Electric Industries, Ltd. --.

Col. 8 line 67, "(MoW)C" should be -- (Mo,W)C --.

Signed and Sealed this

Twenty-second Day of May, 1990

Attest:

HARRY F. MANBECK, JR.

*Attesting Officer*    Commissioner of Patents and Trademarks